(12) United States Patent
Hou et al.

(10) Patent No.: US 6,240,351 B1
(45) Date of Patent: May 29, 2001

(54) TRACKED VEHICLE STEERING SYSTEM WITH FAILURE DETECTION

(75) Inventors: Yifei Hou, Waterloo; Sanjay Ishvarlal Mistry, Cedar Falls; Mark Allen Bergene, Cedar Falls; Scott Allen Toppin, Cedar Falls, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/408,368

(22) Filed: Sep. 29, 1999

(51) Int. Cl.[7] .............................. B62D 11/10; B62D 11/12
(52) U.S. Cl. ............................. 701/41; 701/50; 180/6.44
(58) Field of Search ................................ 701/41, 50, 42, 701/43; 180/6.44, 6.48, 6.7

(56) References Cited

U.S. PATENT DOCUMENTS

| 4,700,794 | * | 10/1987 | Berhagner et al. | 180/6.44 |
| 4,955,442 | * | 9/1990 | Crabb et al. | 180/6.44 |
| 5,535,840 | * | 7/1996 | Ishino et al. | 180/6.44 |
| 5,611,405 | * | 3/1997 | Ishino et al. | 180/6.44 |
| 5,921,335 | * | 7/1999 | Staetker | 180/6.44 |
| 5,948,029 | * | 9/1999 | Straetker | 701/41 |
| 6,039,132 | * | 3/2000 | Easton | 180/6.44 |

OTHER PUBLICATIONS

U.S. Application No. 09/053,600.

* cited by examiner

Primary Examiner—William A. Cuchlinski, Jr.
Assistant Examiner—Arthur D. Donnelly

(57) ABSTRACT

A control system is provided for a tracked vehicle drive/steering system having an engine driven hydraulic steering pump which drives a hydraulic steering motor. The steering pump is responsive to steering control signals representing a status of an operator manipulated steering wheel. The steering motor provides an input to a differential track drive mechanism which responds to manipulation of the steering wheel and drives left and right tracks to turn the vehicle. The control system includes a control unit which receives signals from an engine speed sensor, a steering motor rotation speed and direction sensor, and the steering control signals. The control unit, when the steering control signals indicate that the steering wheel is turned in a direction opposite to a direction of rotation of the steering motor, generating and saving a first ratio value representing a ratio of the motor speed to the pump speed. Then, if the steering control signal is unchanged after a certain time duration, the control unit generates and saves a second ratio value representing a later ratio of the motor speed to the pump speed. The control unit then calculates a difference value representing a difference between the first and second ratio values, and generates a fault signal if the difference value has a magnitude which is less than a predetermined magnitude. Thus, the control system generates a fault signal when the sensed signals indicate that the steering pump swashplate position is not changing as it should in response to changes in steering wheel position.

6 Claims, 6 Drawing Sheets

TRACKED VEHICLE STEERING SYSTEM WITH FAILURE DETECTION

BACKGROUND OF THE INVENTION

The present invention relates to a tracked vehicle drive/steering system.

Known production tracked vehicles, such as the John Deere 8000T and 9000T series track tractors, include an engine-driven variable displacement steering pump which powers a hydraulic fixed displacement steering motor. The steering motor drives, via a cross shaft and a gear, a left planetary drive. The steering motor also drives, via the cross shaft, a gear and a reverser gear, a right planetary drive. A steering control signal is provided by a transducer which detects rotation of a steering wheel. The speed and direction of rotation of the steering motor is normally proportional to the position of the steering wheel, and these parameters are sensed by a Hall effect motor speed and direction sensor. Certain types of steering pump related failures, such as contamination in the control valve and malfunction of the feedback linkage between the steering pump swashplate and its second stage control valves could cause the pump swashplate to hydraulically lock (stick) at a certain non-zero position. This type of failure can lead to a continuous turning of the vehicle, even when the steering wheel is in a position commanding no turn. It would be desirable to provide a method of detecting such failures, and of preventing vehicle turning unless turning is actually commanded by the operator.

SUMMARY OF THE INVENTION

Accordingly, an object of this invention is to provide a system or method of detecting certain failures in a tracked vehicle drive/steering system.

A further object of the invention is to provide such a system which prevents vehicle turning unless turning is actually commanded by the operator.

These and other objects are achieved by the present invention, wherein a control system for a tracked vehicle drive/steering system includes a steering system control unit which receives signals from a pump speed (engine speed) sensor and from a steering motor speed sensor. The ratio of the motor speed to the pump speed represents the swashplate angle of the steering pump during steering action. For a normally functioning steering system, if the pump receives a control signal in a reverse steering direction, the pump swashplate angle will start do decrease. When the control unit sends out a reverse steering direction command above a certain magnitude, it also calculates and saves the ratio of the motor speed to the pump speed. The control unit recalculates the above ratio after a certain time duration, if the same reverse steering direction command is still present. The control unit generates a fault signal if the ratio is not decreasing.

DESCRIPTION OF THE PREFERRED EMBODIMENT

Figure 1:
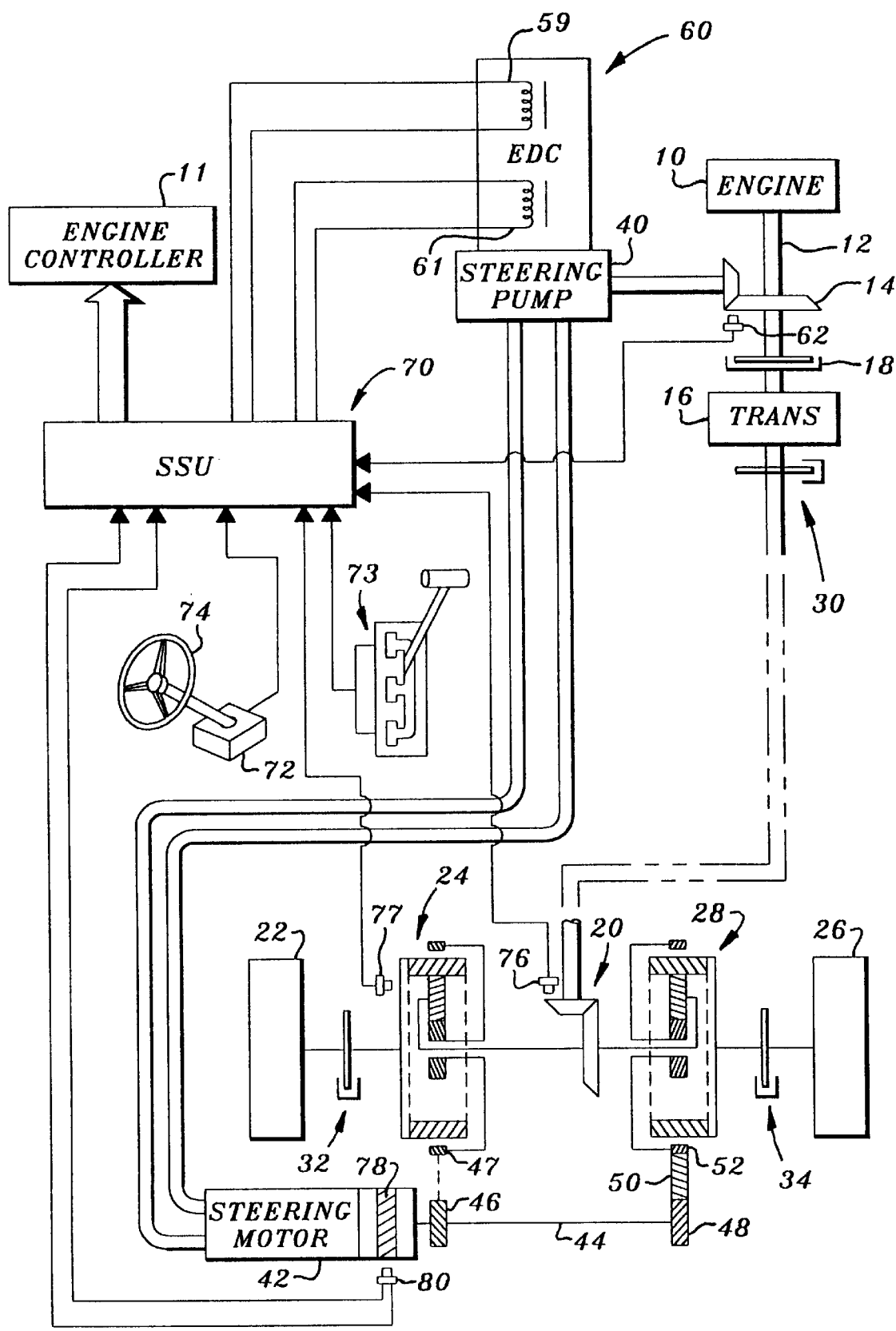
FIG. 1 is a simplified schematic diagram of a tracked vehicle drive and the control system of the present invention.
Figure 2:
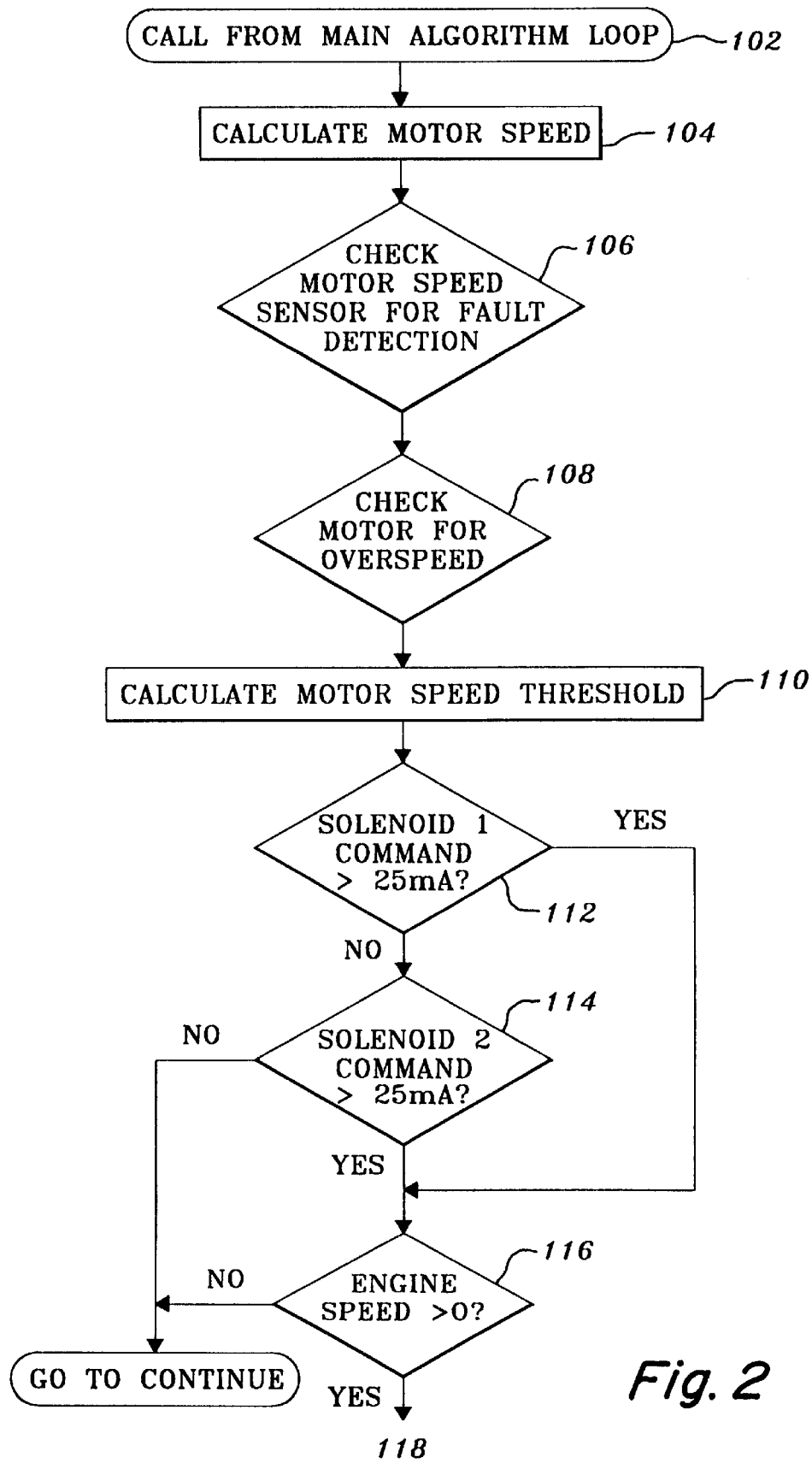
FIGS. 2–6 show a logic flow diagram of an algorithm executed by a microprocessor-based control unit of the control system of FIG. 1.
Figure 3:
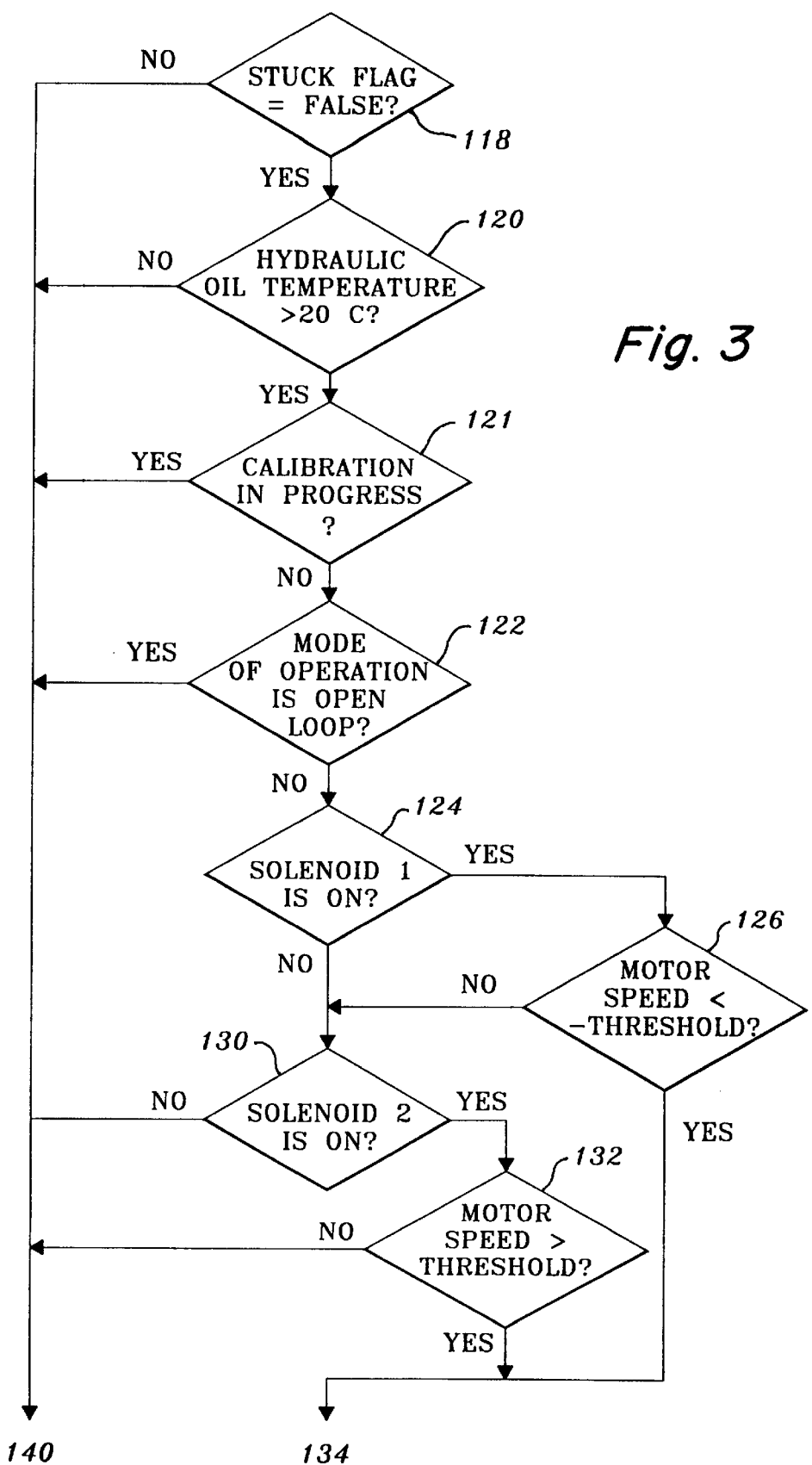
Figure 4:
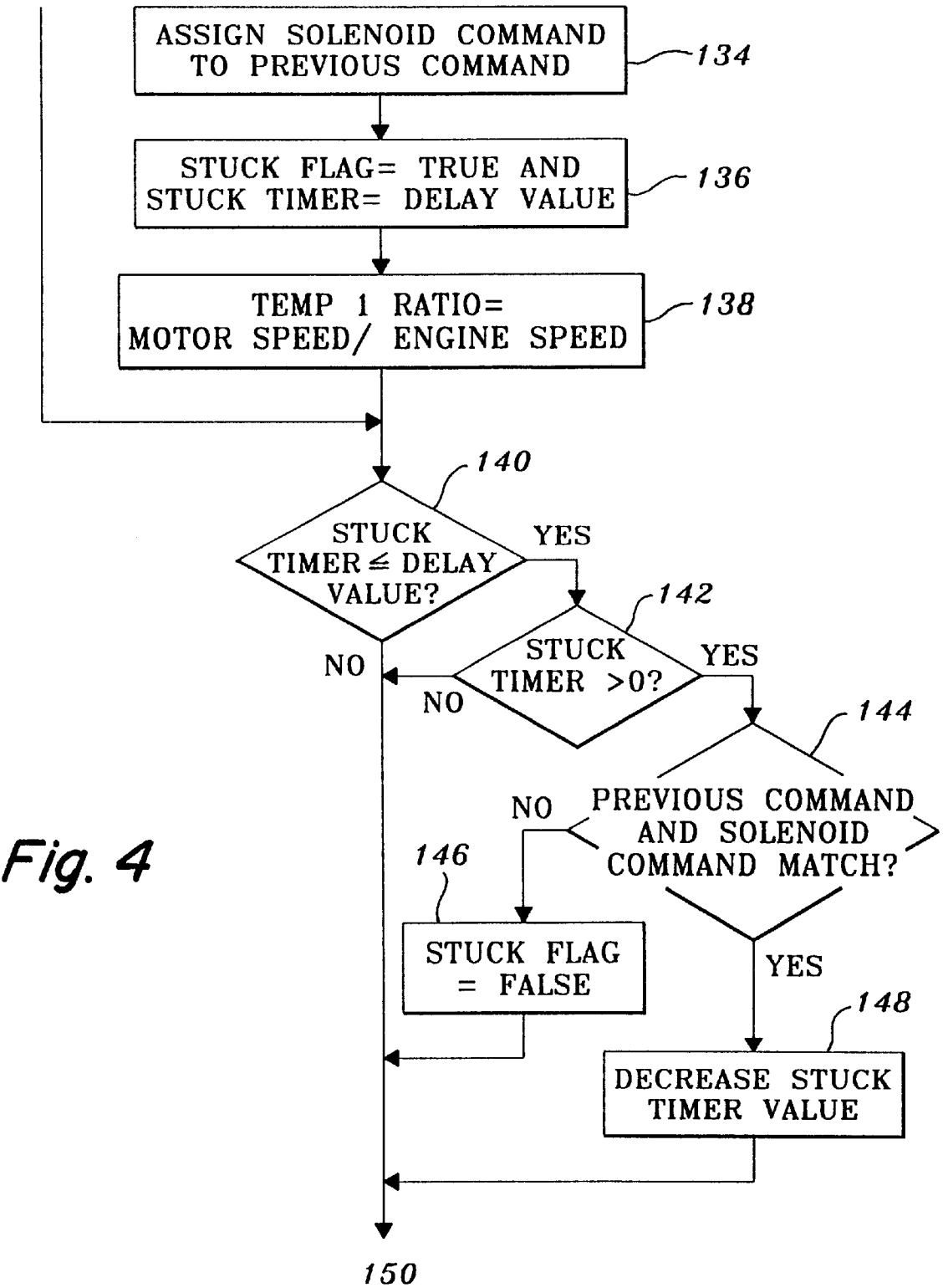
Figure 5:
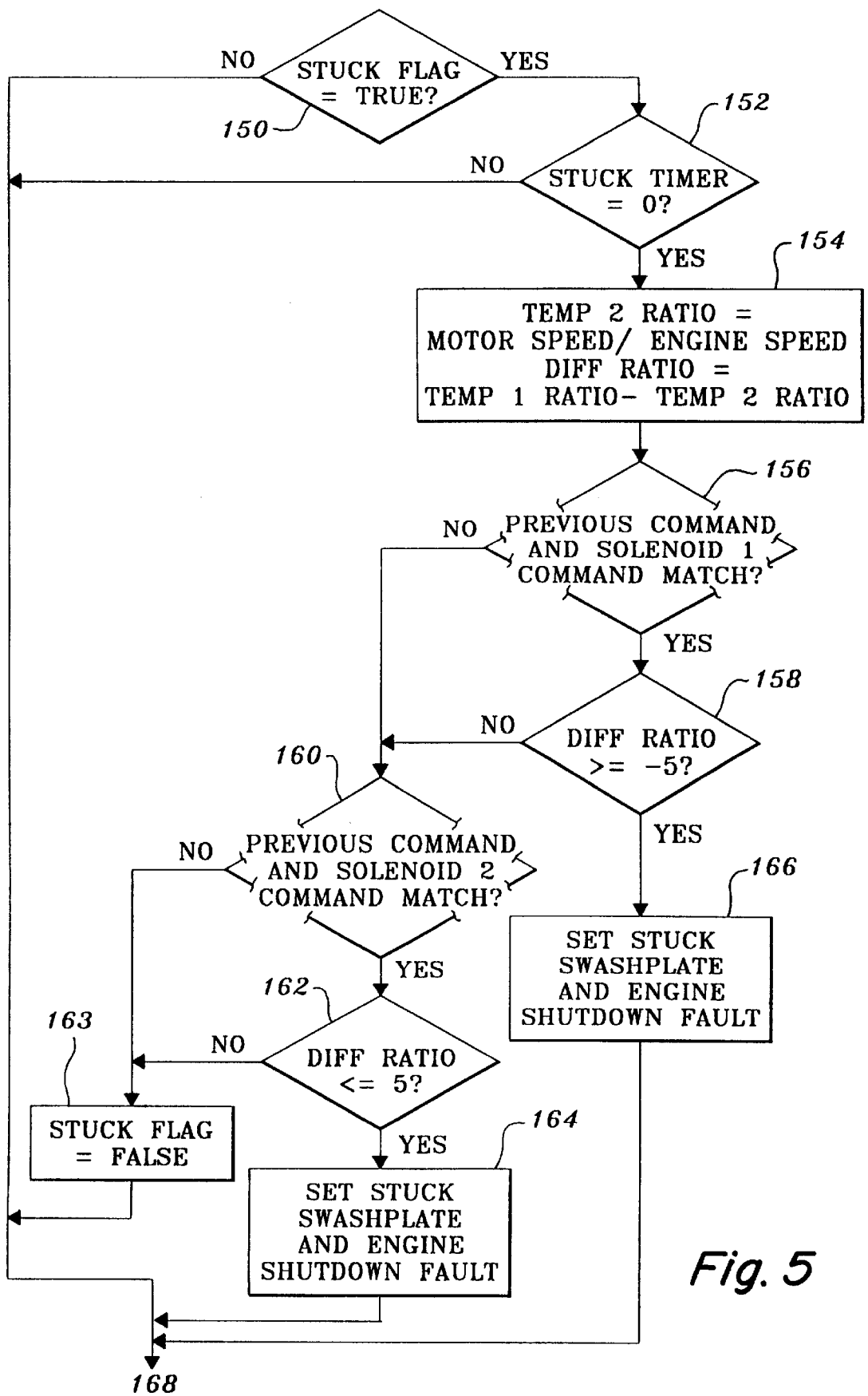
Figure 6:
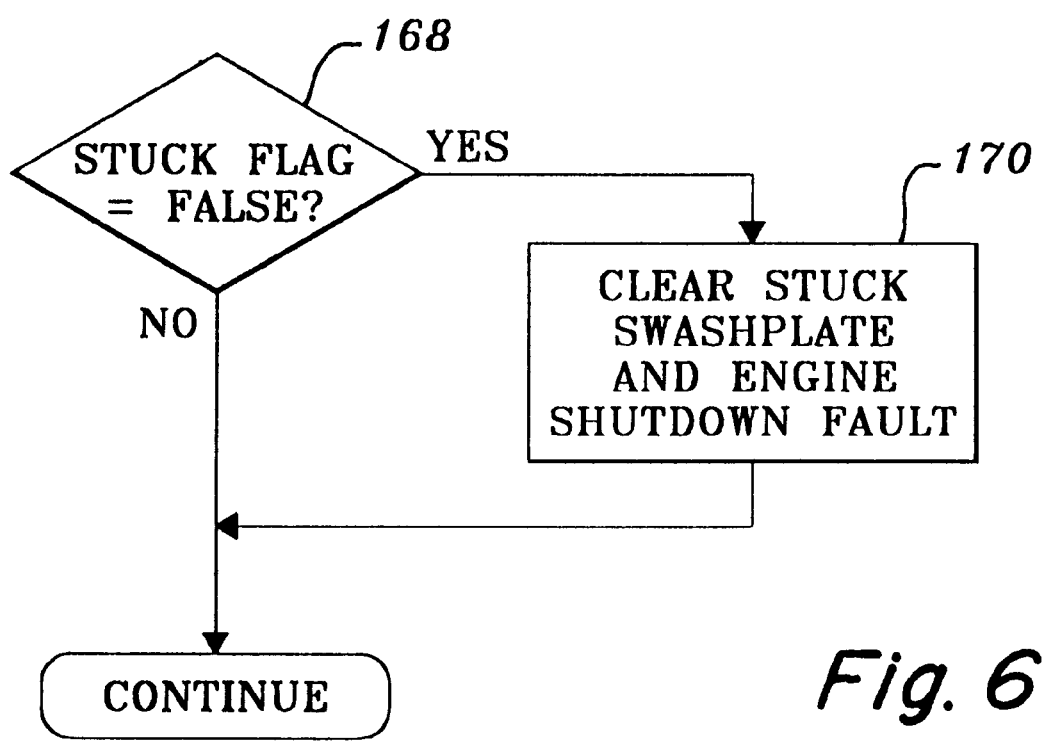

Referring to FIG. 1, an engine 10 of a tracked vehicle has an output shaft 12 which drives a right angle gear 14 and a transmission 16 via a clutch 18. The engine 10 is controlled by an electronic engine control unit 11. The transmission 16 drives a final or right angle drive 20, which drives a left track drive wheel 22 via left steering planetary drive 24, and a right track drive wheel 26 via right steering planetary drive 28. The steering planetary drives 24 and 28 are preferably such as described in U.S. Pat. No. 5,390,751, issued Feb. 21, 1995 to Puetz et al., and assigned to the assignee of this application. Additional outboard planetaries (not shown), as provided on John Deere 8000T tractors, are mounted between the steering planetaries and the respective drive wheels, but are not further described because they are not directly involved in the subject matter of this application. A parking brake 30 is coupled to the output shaft of transmission 16, and left and right service brakes 32, 34 are coupled to the left and right drive wheels 22, 26, respectively.

The right angle gear 14 drives a variable displacement steering pump 40, such as a 75 cc, 90 series pump made by Sauer-Sundstrand. The pump 40, in turn, powers a hydraulic fixed displacement steering motor 42, such as a 75 cc, 90 series motor, also made by Sauer-Sundstrand. The steering motor 42 drives, via a cross shaft 44 and gear 46, a ring gear 47 of left planetary drive 24, and via cross shaft 44, gear 48 and reverser gear 50, a ring gear 52 of right planetary drive 28.

The steering pump 40 has a swashplate (not shown), the position of which is controlled by a swashplate control valve or electronic displacement control (EDC) 60. The EDC is preferably a two stage device with first stage including a flapper type valve operated by a pair of solenoids 59, 61, and a second stage including a boost stage to the pump, such as is used on the production John Deere 8000T Series tracked tractor.

A rotation speed sensor 62, such as a commercially available mag pickup, mounted in proximity to the right angle drive 14, provides an engine speed signal to a steering system unit (SSU) 70. The solenoids 59, 61 of valve 60 are controlled by pump command signals (pump_cmd) generated by SSU 70. The SSU 70 is communicated with the engine control unit 11.

A steering wheel rotary position transducer 72, such as a rotary potentiometer, provides to SSU 70 a steering angle signal (steer_angle) representing the position of an operator controlled steering wheel 74. This description relates to a steering input device with a spring centered neutral position. The present invention could also be applied to a non-centered steering input device. The SSU 70 also receives signals from gear shift lever transducer 73, such as described in U.S. Pat. No. 5,406,860, issued Apr. 18, 1995 to Easton et al.

A drive line rotation speed sensor 76, preferably a differential Hall-effect speed sensor such as used on production John Deere 8000T tractors, is mounted in proximity to the final drive 20, and provides to the SSU 70 a final drive speed, wheel or vehicle speed signal. A hydraulic oil temperature sensor 77, such as used on the John Deere 8000T tractors, provides to the SSU 70 a hydraulic oil temperature signal. A magnetic ring 78 is mounted for rotation with the motor 42, and a Hall-effect transducer 80 mounted near the magnetic ring 78 provides to the SSU 70 a motor speed signal and a motor direction signal.

The SSU 70 includes a commercially available microprocessor (not shown) which executes a subroutine or algorithm 100 which is illustrated by FIGS. 2–6. Correct operation of this subroutine requires that the steering input device 72 and the motor speed and direction sensor 80 are functional. The signal from the steering input device 72 is converted to solenoid command values by the SSU 70. A Solenoid 1 command represents a right turn of the steering input device when in forward gear/direction or a left turn in reverse gear/direction. A Solenoid 2 command represents a left turn of the steering input device when in forward gear/direction or a right turn in reverse gear/direction. If it is determined that the motor speed or direction values are unreliable, such as caused by a detectable open circuit or short circuit fault, then this subroutine/logic is exited from. For example, when it is known that the motor speed sensor 80 is faulty, then the SSU sets an open_loop variable as true. This variable is used to disable the subroutine in case of motor speed sensor fault.

A stage 1 of the subroutine 100 includes steps 102–110. Step 102 is entered when called from a main algorithm loop (not shown) such as executed by SSU of the production 8000T tractor. Step 104 calculates a motor speed value from speed sensor 80. Step 106 checks the motor speed sensor for faults. Step 108 checks motor 42 for overspeed conditions. In step 110 a motor speed threshold, T, is set, which is a minimum value of motor speed required for the system to be able to detect motor speed and direction mismatch.

In stage 2, in steps 112–120 the subroutine checks for and continues working only if the following conditions are found true:

a) Solenoid 1 command is more than 25 mA, or Solenoid 2 command is more than 25 mA. (A command greater than 25 mA approximately corresponds to a motor speed greater than 100 rpm.) This minimum threshold is set to avoid false warnings in case of an over-running steering load, such as when the steering motor 42 is driven by external energy; and b) engine speed is non-zero; and c) the flag indicating stuck swashplate is False, and d) the hydraulic oil temperature is more than 20 degree Celsius. Low oil temperature will cause excessive pump response delay in a normal pump. To avoid resulting problems and to avoid generating false warnings, the subroutine is deactivated when oil temperature is below a specific oil temperature.

Thus, steps 112 and 114 operate so that this subroutine remains active only if the steering wheel position transducer 72 is operational and only if the vehicle is making a right turn or a left turn.

Step 116 exits the subroutine if the engine speed is not greater than 0. Step 118 transfers control to step 140 if a stuck flag value is not set to false. Step 120 transfers control to step 140 if hydraulic oil temperature is not greater than 20 degrees C.

Stage 3 includes steps 121–132. Step 121 transfers control to step 140 if calibration is in progress. Step 122 transfers control to step 140 if the current mode of operation is open loop. Thus, as a result of step 122, this logic and subroutine is active only when the steering system is active in closed-loop mode (that is motor speed and direction sensor is working properly, without any known detectable malfunctions).

Step 124 directs control to step 126 if Solenoid 1 is on, else to step 130. Step 126 directs control to step 134 if motor speed is less than a negative threshold, −T, else to step 130. Step 130 directs control to step 132 if Solenoid 2 is on, else to step 140. Step 132 directs control to step 134 if motor speed is greater than threshold T, else to step 140.

Thus, in stage 3, as a result of steps 122–132, another set of conditions must be satisfied for the subroutine to function. The steering system must not be active in an open-loop mode (i.e. it is active in closed-loop mode), such as when the motor speed/direction sensor 80 is working properly. Also, with solenoid 1 on, motor speed must be less than negative value of the motor speed threshold, with solenoid 2 on, motor speed must be greater than positive value of the motor speed threshold.

As a result of stages 2 and 3 (steps 112–120 and 122–132), the logic ensures that the pump control command is greater than 25 mA in the opposite direction to that of the motor rotation, i.e., this, the operator must be rotating the steering wheel 74 opposite to the vehicle's present turning direction. Steps 126 and 132 operate so that the subroutine is operative only when motor speed is greater than 100 rpm. This avoids false generation of fault signals in case the steering motor is driven by external energy (over-running steering load).

In stage 4, if these conditions are satisfied then step 134 assigns the Solenoid 1 Command value to a Previous Command variable if solenoid 1 (59) is on, and assigns Solenoid 2 Command value to the Previous Command variable if solenoid 2 (61) is on. Then step 136 sets a stuck flag value as true, and sets a stuck timer (delay timer) with a value stored as an End-of-Line (EOL) timer. Step 138 then calculates temp1 ratio value as the ratio of motor speed to engine speed and multiplies it by 64 (to increase its resolution).

Stage 5 includes steps 140–148 and operates to make certain that the vehicle is still in the same turn as the one it started in. If so, then the subroutine starts reducing the timer value to zero, otherwise (if the turn has changed), the stuck flag is reset to false. More particularly, step 140 directs control to step 142 if stuck time is less than or equal to delay value, else to step 150. Step 142 directs control to step 144 if stuck timer is greater than 0, else to step 150. Step 144 directs control to step 148 if the Previous Command and Solenoid Command variables match, else to step 146 which sets stuck flag equal to false, then to step 150. Step 148 decreases the stuck timer value.

Stage 6 includes steps 150–154 which calculates temp2 ratio as the ratio of motor speed to engine speed and multiplies it by 64 (again to increase its resolution), if the stuck flag is true and the stuck timer has been decremented to zero, and calculates a difference of ratio value by subtracting temp2 ratio from temp1 ratio. More particularly, step 150 directs control to step 152 if stuck flag is true, else to step 168. Step 152 directs control to step 154 if stuck timer equals 0, else to step 168. Step 154 sets Temp2 ratio equal to motor speed/engine speed and sets a diff_ratio value equal to temp1 ratio−temp2 ratio.

Stage 7 includes steps 156–166 which operate to set a stuck swashplate fault and to set a pump fault, if previous command is 1 AND solenoid 1 is on and the difference of ratio is greater than or equal to −5, or if previous command is 2 and solenoid 2 is on and difference of ratio is less than or equal to +5, otherwise, the stuck flag is set as false at step 163. Thus, when a pump fault is set by the SSU 70, then SSU 70 sends a signal to the engine controller 11 to shut down the engine 10 via a message over a CCD bus (not shown). More particularly, Step 156 directs control to step 158 if Previous Command and Solenoid 1 command match, else to step 160. Step 158 directs control to step 166 if diff_ratio is not less than −5, else to step 160. Step 160 directs control to step 162 if Previous Command and Solenoid 2 command match, else to step 163. Step 162 directs control to step 164 if diff_ratio is not greater than 5, else to step 163. Step 163 sets a stuck flag value to false and directs the subroutine to step 168. Step 164 sets a stuck swashplate flag and an engine shutdown fault. Step 166 sets a stuck swashplate flag and an engine shutdown fault flag.

Stage 8 includes steps 168–170, which operate to clear the stuck swashplate fault, clear pump fault and set stuck timer as the EOL timer value plus 0.10 second, if the stuck flag is false. More particularly, step 168 directs control to step 170 if the stuck flag is false, else exits the subroutine. Step 170 clears the stuck swashplate flag and clears the engine shutdown fault flag and exits the subroutine.

Thus, steps 154–166 operate to compare the changes or difference in the motor speed/engine speed ratio to changes in the command signals which are supposed to determine the angle of the swashplate (not shown) of pump 40. If the changes in the ratio value match the changes in the command signals, then it is an indication that the system is functioning properly. If the changes in the ratio value do not match the changes in the command signals, then it is an indication that the system is not functioning properly and the system of the present invention generates a fault signal which can be used to trigger an engine shutdown.

Normally, when the steering wheel 74 is turned from a position commanding a turn in one direction, through a center position to a position commanding a turn in the opposite direction, the command signal supplied to the steering pump 40 will be reversed and will cause the steering pump swashplate to similarly reverse its position and, therefore, the ratio of the steering motor speed to pump speed will rapidly vary in a similar manner. If this ratio does not vary in manner similar to the variation of the steering wheel position, it is an indication that a failure of some sort has occurred and that the steering pump 40 no longer responds to the pump control command signal produced by the steering wheel 74.

This subroutine is continuously executed by the SSU 70 during steering operation so that if the SSU 70 detects a prolonged violation of the relationship, a fault code will be generated and stored, and an engine shutdown command will be sent to the engine controller 11 to stop the operation of the vehicle immediately.

The following is a program listing of the computer program which implements the subroutine illustrated by the flow chart of FIGS. 2–6.

Stuck Swashplate Detection Logic Program Listing.

```
/*    We are assuming that
          - Steering input device is functional and
          - Motor direction is also functional
       in order to detect this condition. /*
mot_spd1_threshold = min_spd_threshold/2;
if (((SOL1 > 250) || (SOL2 >250)) && (engine_spd != 0) &&
       (stuck_flag == FALSE)
       && (hyd_oil_temp > 84))
{
if ((!open_loop) && (((SOL1) && (mot_spd1 < -mot_
       spd1_threshold))
       || ((SOL2) && (mot_spd1 > mot_spd1_threshold))))
   {
   if (SOL1)
       previous_command = 1;
   else if (SOL2)
       previous_command = 2;
   stuck_flag = TRUE;
   stuck_timer = EOL.timer[0]
   temp1_ratio = (long) mot_spd1*64/engine_spd;
   }
}
```

-continued

Stuck Swashplate Detection Logic Program Listing.

```
if ((stuck_timer <= EOL.timer[0]) && (stuck_timer != 0))
   {
   if (((previous_command == 1) && (SOL1)) ||
       ((previous_command == 2) &&
(SOL2)))
       {
           stuck_timer--;
       }
   else
       {
       stuck_flag = FALSE;
       }
   }
if ((stuck_flag == TRUE) && (stuck_timer == 0))
   {
   temp2_ratio = (long) mot_spd1*64/engine_spd;
   diff_ratio = temp1_ratio - temp2_ratio;
   if (((previous_command == 1) && (SOL1) && (diff_ratio >=
       -5))
       || ((previous_command == 2) && (SOL2) &&
       (diff_ratio <= 5)))
       {
       mspd_cnt_st |= sfmask;        /* Set SSU 153 fault */
       pump_flt1_cnt |= sfmask;      /* Set SSU 235 fault */
       }
   else
       {
       stuck_flag = FALSE;
       }
   }
   if (stuck_flag == FALSE)
       {
       mspd_cnt_st &= clr_sfmask;    /* Clear SSU 153 fault */
       pump_flt1_cnt &= clr_sfmask;  /* Clear SSU 235 fault */
       stuck_timer = EOL.timer[0] + tenth_sec;
       }
/*********************************************************
   End of Stuck Swashplate Detection Logic
*********************************************************/
```

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A control system for a tracked vehicle drive/steering system having an engine driven hydraulic steering pump which drives a hydraulic steering motor, the steering pump being responsive to steering control signals representing a status of an operator manipulated steering wheel, the steering motor providing an input to a differential track drive mechanism which responds to manipulation of the steering wheel and turns the vehicle and drives left and right tracks, the control system comprising:

an engine speed sensor;

a steering motor rotation speed and direction sensor; and a control unit receiving the steering control signals and coupled to the engine speed sensor and the steering motor speed sensor, the control unit, when the steering control signals indicate that the steering wheel is turned in a direction opposite to a direction of rotation of the steering motor, generating and saving a first ratio value representing a ratio of the motor speed to the pump speed, then, if the steering control signal is unchanged after a certain time duration, generating and saving a second ratio value representing a later ratio of the motor speed to the pump speed, and the control unit calculating a difference value representing a difference between the first and second ratio values, and the control unit generating a fault signal if the difference value has a magnitude which is less than a predetermined magnitude.

2. The control system of claim 1, wherein:

the control unit generates the fault signal when the difference value is not less than the threshold value.

3. The control system of claim 1, wherein:

the control unit compares the steering control signals to a reference value to determine whether or not the vehicle is being commanded to turn.

4. The control system of claim 3, wherein:

the control unit determines that the vehicle is being commanded to turn when the steering control signal is greater than the reference value.

5. The control system of claim 1, wherein:

the control unit prevents generation of the fault signal when the engine speed is low.

6. The control system of claim 1, wherein:

the control unit prevents generation of the fault signal when a temperature of hydraulic fluid of the pump and motor is below a certain temperature.

* * * * *